Patented Apr. 25, 1950

2,505,366

UNITED STATES PATENT OFFICE 2,505,366

POLYMERIC COMPOSITIONS FROM DIVINYL SULFONE

Dwight L. Schoene, Naugatuck, Conn., assignor to United States Rubber Company, New York, N. Y., a corporation of New Jersey No Drawing. Application July 7, 1948, Serial No. 37,509

6 Claims. (Cl. 260—79.3)

This invention relates to new polymers formed by the addition of polyhydric chemicals and specifically polyhydric alcohols or thiols, to sulfone activated ethylenic linkages, and methods of preparing same.

An object of the invention is the preparation of new and useful polymer compositions. Another object is the preparation of polymers useful as thermoplastic molding compositions. A further object is the formation of polymers which can be extruded as filaments for the production of fibres. Other objects will be apparent from the following disclosure.

The polymers are postulated as having the condensation unit

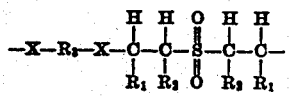

where X is a member from the class consisting of oxygen and sulfur; $R_1$ and $R_2$ are from the class consisting of hydrogen, alkyl and aryl, at least one of the $R_1$ and $R_2$ groups being hydrogen; $R_3$ is a divalent organic radical.

More particularly, the invention is concerned with the formation of polymers from glycols and dithiols with compounds containing two vinyl groups

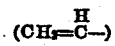

adjacent to a sulfone group whereby in the polymer the condensation unit

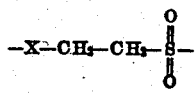

is formed.

It is customary to speak of the molecule supplying the active hydrogen as the donor, and the molecule containing the ethylenic linkage as the acceptor. To assure the formation of polymeric materials substantially stoichiometric equivalents of donor and acceptor should be used. The usual addition occurs with the hydrogen adding to the carbon alpha to the sulfone group, as shown in the structural unit pictured first above. However, it is possible that some of the hydrogen addition takes place on the beta carbon atom giving the structural unit

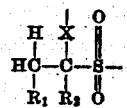

In either case a polymer is formed.

The acceptor compound is a monomeric sulfonyl chemical having from one to two intermediate sulfonyl radicals each linked to a terminal vinyl group or a substituted vinyl group as illustrated by the following:

*Acceptors*

Vinyl sulfone
$CH_2=CHSO_2CH=CH_2$

Isopropenyl sulfone

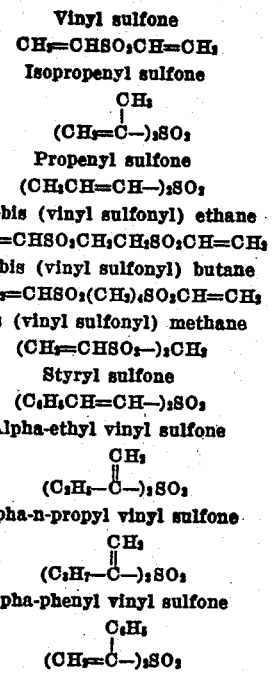

Propenyl sulfone
$(CH_3CH=CH—)_2SO_2$ 1,2-bis (vinyl sulfonyl) ethane
$CH_2=CHSO_2CH_2CH_2SO_2CH=CH_2$ 1,4-bis (vinyl sulfonyl) butane
$CH_2=CHSO_2(CH_2)_4SO_2CH=CH_2$ Bis (vinyl sulfonyl) methane
$(CH_2=CHSO_2—)_2CH_2$ Styryl sulfone
$(C_6H_5CH=CH—)_2SO_2$ Alpha-ethyl vinyl sulfone Alpha-n-propyl vinyl sulfone Alpha-phenyl vinyl sulfone The donor compound is a monomeric compound having two terminals HX— groups, where X is preferably O or S, each being directly attached to a acyclic hydrocarbon, or a benzene nucleus.

The acyclic hydrocarbon chain may be separated or not separated by intervening radicals such as amido, ester, oxygen, sulfur, as illustrated by the following:

*Donors*

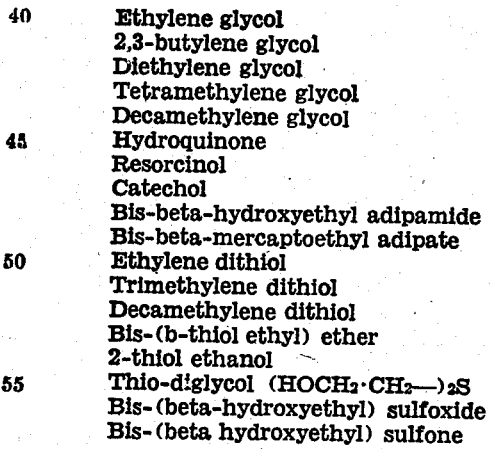

Ethylene glycol
2,3-butylene glycol
Diethylene glycol
Tetramethylene glycol
Decamethylene glycol
Hydroquinone
Resorcinol
Catechol
Bis-beta-hydroxyethyl adipamide
Bis-beta-mercaptoethyl adipate
Ethylene dithiol
Trimethylene dithiol
Decamethylene dithiol
Bis-(b-thiol ethyl) ether
2-thiol ethanol
Thio-diglycol ($HOCH_2 \cdot CH_2—)_2S$
Bis-(beta-hydroxyethyl) sulfoxide
Bis-(beta hydroxyethyl) sulfone The polymerization is conveniently carried out by mixing a catalyst with the active hydrogen compound (donor) and adding the unsaturated monomer (acceptor). This should be done slowly as the reaction is frequently exothermic. At the end of the addition the mixture is heated to complete the reaction. An inert solvent may be employed, if desired. Suitable inert solvents include water, dioxane, chloroform, benzene, toluene, diethyl ether and ethylene dichloride. Although water will react with the vinyl sulfone it may be used as a solvent since its rate of reaction is much slower than the glycols or dithiols.

As catalysts, we may employ any base or alkali which is unreactive with the sulfone, and which has a basic strength at least equivalent to sodium acetate such as tertiary amines having a dissociation constant in water of at least $1.8 \times 10^{-5}$ at 25° C. as well as the quaternary ammonium hydroxides, the alkali and alkaline earth metals, their oxides, hydrides and carbonates, as illustrated by triethyl amine, tributyl amine, trimethyl benzyl ammonium hydroxide, tetramethyl ammonium hydroxide, potassium hydroxide, sodium hydroxide, sodium ethoxide, sodium hydride, phenyl lithium, potassium carbonate, metallic sodium, barium, calcium, etc.

The amount of catalyst necessary, is small; satisfactory polymerizations being obtained with as little as one hundredth molar percent. In most cases the polymerization proceeds rapidly at room temperature and requires external cooling. Satisfactory polymerizations are obtained at temperatures varying from 0° C. to about 200° C. Still lower temperatures may be employed at a sacrifice in reaction times while higher temperatures are limited only by the stability of the reactants or their polymers.

The polymerization is usually allowed to proceed until it has substantially exhausted itself. Acids, in addition to terminating the reaction, reduce the color of the final polymer.

Polymers produced by this process vary from viscous oils to hard solid resins. The polymers at low degrees of polymerization, particularly when achieved through the use of an excess of one monomer, tend to be viscous liquids or low melting solids useful as lubricants, plasticizers, rubber substitutes and the like. At higher degrees of polymerization these polymers may be used for the production of films, fibres, coating materials and molded articles.

The following examples are intended to illustrate, but not to limit, my invention:

Example 1

Vinyl sulfone (0.005 mole) is added to 0.005 mole of ethylene glycol in which a small piece of sodium has been dissolved. The mixture becomes yellow and considerable heat is developed. On cooling, the mass sets to a viscous jelly. Neutralization of the sodium with alcoholic hydrochloric acid, converts the product to a wax-like solid which melts around 60° C. The copolymer is only slightly soluble in acetone, dioxane and benzene, but can be recrystallized from water.

Example 2

A small piece of sodium is dissolved in 0.1 mole of trimethylene glycol and 20 ml. of dioxane is added. To this mixture is added a solution of 0.1 mole vinyl sulfone in 20 ml. of dioxane at such a rate that the temperature does not exceed 70° C. After 5 hours at 55° C., the product crystallizes on cooling to 25° C. The copolymer may be isolated as a waxy, white solid by pouring the warm solution into 10 volumes of cold methanol containing 1 ml. of formic acid. It melts at about 75° C.

Example 3

A mixture of 0.005 mole each of vinyl sulfone and trimethylene glycol are poured into 5 ml. of an aqueous 20% sodium hydroxide solution. The solution becomes warm and the copolymer precipitates as viscous oil.

Example 4

A small piece of sodium is dissolved in 0.10 mole of trimethylene glycol, and 0.10 mole of vinyl sulfone is added slowly, keeping the temperature at about 100° C., at the end of addition the product is a thin oil. The mixture is then heated overnight at 170° C. which converts it to a viscous liquid. On cooling it solidifies to a hard brittle resin.

Example 5

A mixture of 0.01 mole each of vinyl sulfone and N,N'-di-(beta-hydroxyethyl)-adipamide is treated with 7 ml. of 20% sodium hydroxide. The reaction mixture becomes warm and within 5 minutes a solid, white copolymer forms on the surface of the liquid.

Example 6

Three drops of a concentrated solution of sodium methoxide in methanol are added to 5.40 g. of trimethylene dithiol in 300 ml. of chloroform followed by 5.92 g. of vinyl sulfone. Within a few minutes the solution is full of the finely divided white copolymer. The mixture is refluxed for 7 hours, acidified with 2 ml. of formic acid and stirred into 300 ml. of petroleum ether (B. P. 30–60° C.). The precipitate is filtered and dried at 65° C. It is a pure white powder which melts under slight pressure at 115° C. but the melt does not flow readily until the temperature reaches 150° C. Even at this temperature the melt remains very viscous. On cooling, the melt solidifies to an opaque, white, porcelain-like solid.

Example 7

A mixture of 0.5 ml. each of vinyl sulfone and trimethylene dithiol is treated with one drop of tributyl amine. The mixture reaches the boiling point within 30 seconds and, on cooling, sets to a hard, opaque resin.

Example 8

A mixture of 6.90 g. of bis-(beta-mercaptoethyl)-ether and 5.90 g. of vinyl sulfone are added in 0.5 ml. portions to a test tube containing one drop of a concentrated solution of sodium methoxide in methanol. The reaction is very vigorous and the temperature exceeds 150° C. during the early part of the addition. After about half the mixture has been added, two more drops of catalyst solution are stirred into the reaction mixture and the addition is completed. At this point the copolymer is a low viscosity colorless liquid at 150° C. which solidifies on cooling to a waxy solid. The tube is flushed with nitrogen and placed in a 160° C. metal bath overnight. This causes a marked increase in melt viscosity. On cooling the copolymer solidifies very rapidly to a hard, opaque, off-white solid.

Having thus described my invention, what I claim and desire to protect by Letters Patent is:

1. A polymeric addition product of equimolecular proportions of a monomeric glycol from the class of dihydricglycols and dithioglycols, and a monomeric sulfonyl chemical having from one to two intermediate sulfonyl radicals each linked to a terminal radical from the class consisting of vinyl and monohydrocarbon-substituted vinyl.

2. A polymeric addition product of equimolecular proportions of a monomeric alkylene dithiol and divinyl sulfone.

3. A polymeric addition product of equimolecular proportions of ethylene glycol and divinyl sulfone.

4. A polymeric addition product of equimolecular proportions of trimethylene glycol and divinyl sulfone.

5. A polymeric addition product of equimolecular proportions of trimethylene dithiol and divinyl sulfone.

6. A polymeric addition product of equimolecular proportions of a monomeric glycol from the class of dihydricglycols and dithioglycols, and divinyl sulfone.

DWIGHT L. SCHOENE.

REFERENCES CITED

The following references are of record in the file of this patent:

UNITED STATES PATENTS

| Number | Name | Date |
|---|---|---|
| 2,201,884 | Carothers | May 21, 1940 |
| 2,347,182 | Coffman | Apr. 25, 1944 |
| 2,348,705 | Alderman | May 16, 1944 |

OTHER REFERENCES

Stahmann: Jour. Organic Chemistry, vol. II, pages 719–735, November 1946.